July 29, 1941.   H. F. OMER   2,250,549
BELT CONNECTOR
Filed Feb. 19, 1940   2 Sheets-Sheet 1

INVENTOR.
Harry F. Omer
BY Hoover & Hamilton
ATTORNEYS

July 29, 1941.  H. F. OMER  2,250,549
BELT CONNECTOR
Filed Feb. 19, 1940  2 Sheets—Sheet 2

INVENTOR.
Harry F. Omer
BY Hovey & Hamilton
ATTORNEYS

Patented July 29, 1941

2,250,549

UNITED STATES PATENT OFFICE 2,250,549

BELT CONNECTOR

Harry F. Omer, Kansas City, Kans.

Application February 19, 1940, Serial No. 319,706

8 Claims. (Cl. 24—33)

This invention relates to means for interconnecting the ends of belts, and the primary object is to provide a belt connector having the inherent quality of permitting unrestricted movement of the endless belt around pulleys of different diameters as twisting or relative movement of the belt ends in different directions about their longitudinal axis occurs.

This invention has for one of its aims the provision of a belt connector wherein is incorporated an element formed of a number of strands of flexible substance that are held in operative position by uniquely designed clamps carried by the belt ends respectively, and presenting slots through which the end portions of said strands are projected to the end that flexing of the connector may take place at different points along the length thereof instead of about a fixed axis.

A yet further important aim of this invention is the provision of a belt connector which will be free from mechanical friction or metal wearing parts, as a result of the specially created flexible member, fabricated of suitable materials and designed so that in effect, it is a section of the belt and is as capable of flexing and bending as the belt to which it is applied, thereby materially reducing repairs and prolonging the useful life of the belt.

Another important object of this invention is to provide a belt connector of the aforementioned character wherein the ends of a specially designed, fabricated flexible member are increased in thickness and held under compression to establish a binding action that prevents disassociation of the parts yet allows desirable flexing along a length of the connector.

A still further object of this invention is to provide a belt connector having a number of substantially U-shaped flexible strands, all of which are secured together by yieldable substance to allow flexing and twisting of the belt ends during their movement about the pulleys.

Another aim of the invention is to provide a belt connector having a pair of clamps each adapted to removably engage a fabricated, flexible connecting member, said member being extended through slots created in the clamps to the ends that no mechanical, fixed relation is established between the clamps of the connector and whereby desirable results are obtained with respect to twisting of the belt ends and flexing of the connector itself, without mechanical friction or metal-to-metal contact.

Because of the possibility of incorporating the broad concepts of this invention in belt connectors having widely varying physical characteristics, a great many minor objects will, of necessity, appear during the course of the following specification, referring to the accompanying drawings illustrating a number of forms of the invention and wherein.

Figure 1:
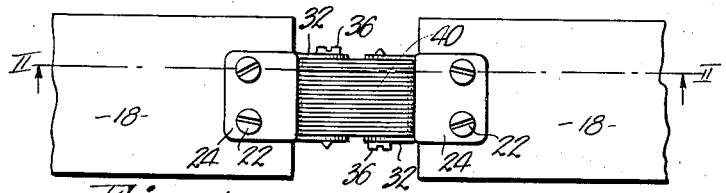
Figure 1 is a plan view of a belt connector embodying this invention and in operative position.
Figure 2:
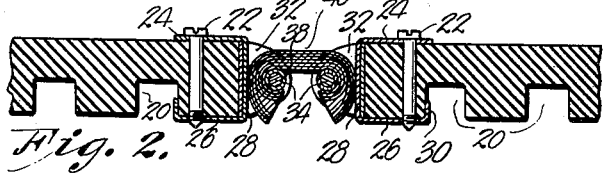
Fig. 2 is a sectional view through the connector taken on line II—II of Fig. 1.
Figure 3:
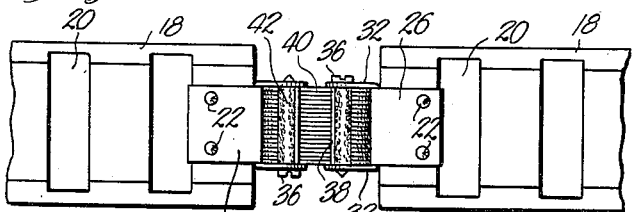
Fig. 3 is an inverted plan view of the connector and belt ends.

Belt ends 18 illustrated in Figs. 1 to 3 inclusive, are of the V-type wherein notches 20 are provided along one side thereof. These belt ends are held in spaced relation by the connector about to be described, and each of said ends has a clamp secured thereto through the medium of bolts or the like 22, that extend through the body of the belt end. Modification of these end clamps permit its adoption of V-type belts not provided with notches, teeth or cogs.

Each clamp comprises a U-shaped member having legs 24 and 26 and a bight 28. Leg 26 has an inturned flange 30 entering a notch 20, and bolts 22 pass through openings provided in these legs 24 and 26.

A pair of ears 32 formed on each clamp extend outwardly in parallel relation to each other to support a cross pin 34, that is in the nature of a machine screw having a head 36 engageable by a screw driver when pin 34 is manipulated to move it to or from the operative position bridging the space between ears 32. Obviously, rivets or bolts of known types may be used in lieu of cross pins 34.

Figure 4:
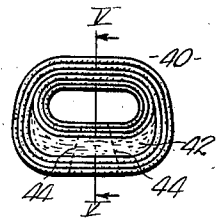
Fig. 4 is a side elevational view of the flexible connecting member, showing the same entirely removed from association with other parts of the device.
Figure 5:
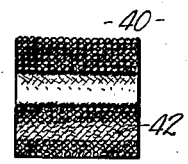
Fig. 5 is a cross sectional view taken on line V—V of Fig. 4.
Figure 6:
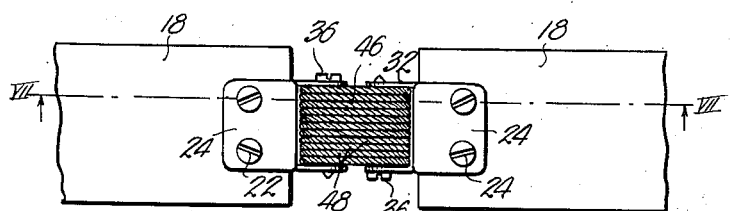
Fig. 6 is a top plan view of a belt connector made to embody a modified form of the invention.
Figure 7:
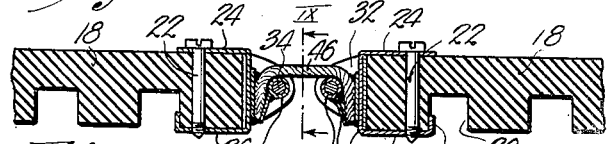
Fig. 7 is a sectional view taken on line VII—VII of Fig. 6.
Figure 9:
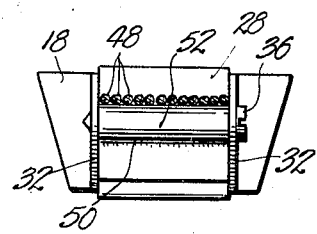
Fig. 9 is a cross sectional view taken on line IX—IX of Fig. 7.
Figure 8:
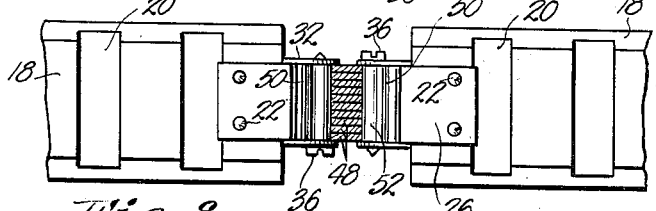
Fig. 8 is an inverted plan view of the connector shown in Fig. 6.
Figure 10:
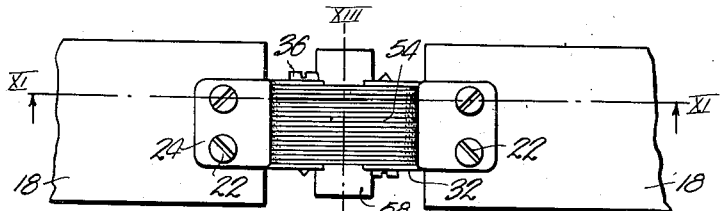
Fig. 10 is a top plan view of a belt connector made to embody another form of the invention.
Figure 11:
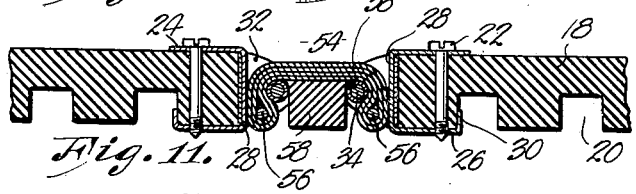
Fig. 11 is a longitudinal sectional view taken on line XI—XI of Fig. 10.
Figure 13:
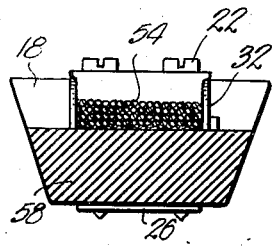
Fig. 13 is a cross sectional view taken on line XIII—XIII of Fig. 10.
Figure 12:
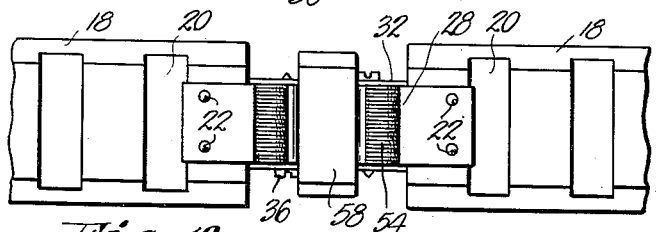
Fig. 12 is an inverted plan view of the form of connector shown in Fig. 10.

A unique connecting member, generally designated by the numeral 40 and specially created to embody the broad concepts of this invention, joins the two clamps that comprise the parts just above described. This connecting member is made of a number of flexible strands wound to form a body such as illustrated in Figs. 4 and 5, and having an irregular, elliptical, longitudinal cross sectional contour.

As member 40 is formed, a binding substance in the nature of latex, or material that will yield with the strands, yet maintain member 40 in a normal position when force is not exerted thereon, is applied so that member 40 may be handled as a unit when placing the same between the clamps on belt ends 18. One stretch of the elliptical body of member 40 is thicker than the other stretch thereof, and appreciably thicker than the bights at the ends of the elliptical body so that a withdrawal thereof from the spaces between pins and sleeves 34 and 38 respectively, and the bight 28 of the clamps, is prevented.

In the instance shown, an insert 42 of fabric or other substance suitable to meet the requirements, is placed between the windings as member 40 is produced. Instead of the single insert illustrated, a number thereof may be positioned between a number of the windings. After member 40 is made, it is cut along the dotted lines 44 for the purpose of removing a section to permit the passage of the connector around the pulley without restriction. The ends exposed by cutting may be covered by a coating of latex or any other desirable material, to prevent absorption of moisture.

The inherent quality of member 40 to longitudinally lengthen when placed under tension, or when force is applied, will allow the removal of a relatively small section between lines of cut 44, and in many instances, the line of cut may be a single slit merely to sever the lower stretch of member 40 intermediate the ends thereof.

After such a single slit is made and during the time that the clamp is in work, the ends formed by slitting the lower stretch will move apart so that the connector may pass around a pulley of relatively small diameter without the ends formed by slitting, coming into engagement with each other. The upper stretch of member 40, plainly shown in Fig. 2, is on the outer side of pins 34 and in the line of greatest pull. This upper, continuous stretch, which carries the load on the belt, is in alignment with the body portion of belt ends 18 and spaced in relation to the load section of the belt by pins 34. The quality of member 40 to twist about its longitudinal axis and flex transversely without mechanical friction, renders the connector less destructive to belt ends and pulleys and insures that no part of the belt ends will be held away from the inclined faces of the pulleys as the belt moves thereover.

Connecting member 40 is resilient and yieldable throughout its body, yet capable of overcoming the tendency to withdraw its thickened ends from within the slot established between sleeves 38, or other equivalent member, and the bight 28 of the respective clamps. In fact, the greater the pull upon belt ends 18, the more securely is connecting member 40 anchored by compression at its ends.

Regardless of the manner in which this member 40 is severed at one of its stretches, the same will become substantially U-shaped, as seen in Fig. 2, when the belt is passing over pulleys. Thus, a substantially U-shaped connecting member 40 is presented to hold together the clamps on the belt ends. The bight of this U-shaped member 40, bridges the distance between the clamps on belt ends 18 and the legs which progressively increase in thickness as the free ends thereof are approached, pass through the slots formed in the clamps respectively.

The form of the invention illustrated in Figs. 6 to 9 inclusive, is slightly different from that just described and illustrated in Figs. 1 to 5. The ability of belt ends 18 to twist in opposite directions about their longitudinal axis, however, is not impaired when the invention takes the form shown in these five views. Likewise, the flexible nature of the connecting member 46 shown and now about to be described, allows attaining the same end and fulfilling the same broad object as that form of connecting member 40, shown in Figs. 1 to 5 inclusive.

The clamps shown in Figs. 6 to 9 are of the same character as those illustrated in Fig. 1, in that the same are secured in place by bolts or the like 22, which pass through legs 24 and 26 of a U-shaped clamp, the bight 28 of which lies against the end of belts 18 when the clamps are in place. Flange 30 engages a notch 20, as above described. Ears 32 of each of the two clamps carry cross pins 34 of a nature identical to those above described.

The connecting member 46 is made up of a number of separate strands 48 cut from flexible twisted cables and joined together at their ends by solder or the like 50, which serves to interconnect the ends of strands 48 to the sleeve 52, which circumscribes each pin 34 respectively. Thus, the connecting member 46 in this form of the invention, comprises a number of flexible metallic strands 48 bent into a U-shaped body, the legs of which extend through the slots formed by the clamps between pins 34 and the bight 28 of said clamps.

The ends of connecting member 46 are relatively thick to preclude withdrawal through the slots and in this instance, attachment to sleeve 50 further assists in precluding accidental parting of the clamps on belt ends 18.

The form of the invention shown in Figs. 10 to 13 inclusive, is slightly different than the two forms above described, but embodies the same broad concepts in that the connecting member broadly designated by the numeral 54, is formed of a wound body of strands that passes between pins 34 and bight 28 of the clamps to receive an element 56 which serves to thicken the ends of member 54 to preclude withdrawal from the slots formed as above indicated.

This connecting member 54 is initially wound into a circumscribing body and thereafter pressed together by the application of diametrically opposed forces so that the bight of the U-shaped member 54 may extend between pins 34 along the upper sides thereof. Sleeves 38 are placed on these pins 34 to serve as strengthening members for the pins and to act as spacers for ears 32. The legs of the U-shaped member are thickened at their ends to prevent accidental withdrawal.

This particular connecting member 54 is made like connecting member 40 in that it is produced of a number of wound fabric strands, coated with latex, or some suitable resilient substance that permits the several strands to adjust themselves in relation to each other and which will permit stretching but yet maintain the member in a normal position when no force is exerted thereon. Stretching, flexing and twisting of the bight member 54 contributes to the efficiency of the connector and in some instances, it has been found desirable to add a filler piece, a tooth or cog 58 to the inner side of the bight of member 54 to contact the inclined sides of the pulleys as the belt is in operation.

Since the binding material employed to hold together the strands of material from which connecting member 54 is made permits attachment of filler piece 58 by vulcanization, the application of this piece 58 may be accomplished through such means.

Figure 14:
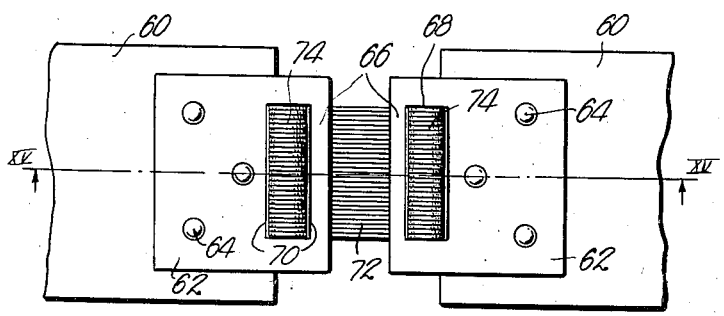
Fig. 14 is a top plan view of a belt connector made in accordance with a still further modification.
Figure 15:
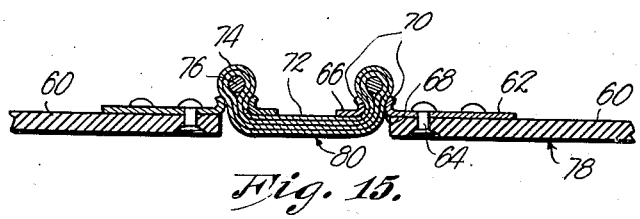
Fig. 15 is a sectional view taken on line XV—XV of Fig. 14.

The invention is embodied in the type of connector shown in Figs. 14 and 15. In this instance, the ends 60 of a flat belt are joined. A clamp 62 is secured by rivets or the like 64 to each belt 60. A projected portion 66 of each clamp 62 has a slot 68 formed therein by striking upwardly a pair of lips 70, which are curled outwardly from each other to present opposed arcuate smooth surfaces. Connecting member 72 formed of a number of strands wound to present a circumscribing body, which is thereafter formed together by the application of diametrically opposed forces, has the strands thereof joined into a unitary member 72 by the application of latex or some similar yieldable substance, as above set down.

The looped ends 74 of this member 72 are thickened by the application of elements 76 that may be easily withdrawn when the legs of the U-shaped connecting member 72 are to be withdrawn from slots 68. The surface 78 which rides over the conventional pulleys, is in the same plane as the surface 80 of connecting member 72. The connecting member 72 has substantially the same ability to stretch and flex as belt ends 60 and the introduction of the belt connector will not, therefore, impair the normal operation of belt 60.

When the invention contemplated is embodied in any of the forms above described and illustrated herewith, is built into belt connectors of the character disclosed, the belt ends are more quickly joined than has been possible heretofore; the belt ends are not subjected to undue strain incident to the rigid links which have consistently been used; the belt may pass over pulleys of relatively small diameters without lifting any portion of the surface of the belt ends from the sides of the pulley; the belt is maintained taut at the ends; and the wear on the belt connector is confined to a single connecting member that may be replaced quickly and inexpensively.

Since the flexible connecting member as illustrated is bound in place at its ends, and since it has the resilient properties inherent in the cords and covering material, it is clear to one skilled in the art that the entire assembly between the clamps may be encased so that the device may be further unified. The nature of the several flexible members illustrated and described is such as to provide a resilient element that will hold the clamps in spaced relation yet which permits stretch necessary to efficient operation as hereinabove indicated.

Since it is possible to embody the invention in belt connectors having different physical characteristics than those illustrated, it is desired to be limited in the enjoyment of this invention only by the spirit thereof and the scope of the appended claims.

Having thus described the invention, what is claimed as new and desired to be secured by Letters Patent is:

1. A connector for the ends of belts comprising a pair of clamps in spaced relation, secured to the belt ends respectively and each provided with a transverse slot; a flexible connecting member joining the clamps having the end portions projecting through the slots; and means independent of the clamps at the ends of said member for preventing movement of the end portions of the member through the slots.

2. A connector for the ends of belts comprising a pair of clamps in spaced relation, secured to the belt ends respectively and each provided with a transverse slot; a flexible connecting member joining the clamps having the end portions projecting through the slots; and means independent of the clamps at the ends of said member for preventing movement of the end portions of the member through the slots, said connecting members being flexible to permit limited movement of the belt ends about their longitudinal axes in different directions.

3. A connector for the ends of belts comprising a pair of clamps in spaced relation, secured to the belt ends respectively and each provided with a transverse slot; a flexible connecting member joining the clamps having the end portions projecting through the slots; and means at the ends of said member for preventing movement of the end portions of the member through the slots, said connecting member being U-shaped, flexible and relatively wide to permit twisting to a limited degree as the belt travels over pulleys.

4. A connector for the ends of belt comprising a pair of clamps in spaced relation, secured to the belt ends respectively and each provided with a transverse slot; a flexible connecting member joining the clamps having the end portions projecting through the slots; and means independent of the clamps at the ends of said member for preventing movement of the end portions of the member through the slots, said connecting member being formed of a plurality of flexible strands secured together at the ends thereof to present a thickened portion wider than the slots.

5. A connector for the ends of belts comprising a pair of clamps in spaced relation, secured to the belt ends respectively and each provided with a transverse slot; a flexible connecting member joining the clamps having the end portions projecting through the slots; and means at the ends of said member for preventing movement of the end portions of the member through the slots, said connecting member being formed of a plurality of flexible strands bound together in spaced relation to each other, along the portions thereof between the slots by resilient substance to yieldably hold the connecting member in normal position.

6. A connector for the ends of belts comprising a pair of clamps in spaced relation, secured to the belt ends respectively and each provided with a transverse slot; a flexible connecting member joining the clamps having the end portions projecting through the slots; and means at the ends of said member for preventing movement of the end portions of the member through the slots, said connecting member being formed of a plurality of flexible strands having a tooth secured thereto between the said clamps.

7. A connector for the ends of belts comprising a pair of clamps in spaced relation, secured to the belt ends respectively; a pair of spaced apart ears on each clamp; a pin extending between the ears in spaced relation to the ends of each belt end; a flexible connecting member having portions thereof between the pins and the belt ends; and means at the ends of the connecting member for increasing the thickness of the member to form means independent of the clamp to prevent withdrawal thereof through the spaces between the pins and the belt ends.

8. A connector for the ends of belts comprising a pair of clamps in spaced relation, secured to the belt ends respectively; and a built-up, flexible connecting member joining the clamps, said connecting member comprising a plurality of fabric strands each encased in resilient binding material, said binding material serving to maintain the members in a unitary condition, said connecting member having a tooth secured thereto between the ends thereof.

HARRY F. OMER.